US010018296B2

(12) United States Patent
Barthel et al.

(10) Patent No.: US 10,018,296 B2
(45) Date of Patent: Jul. 10, 2018

(54) CONNECTOR

(71) Applicant: TI Automotive (Heidelberg) GmbH, Heidelberg (DE)

(72) Inventors: Iris Barthel, Schauenburg (DE); Hans Jensen, Dettingen unter Teck (DE); Alexander Bol, Guntershausen (DE)

(73) Assignee: TI Automotive (Heidelberg) GmbH, Heidelberg (DE)

( * ) Notice: Subject to any disclaimer, the term of this patent is extended or adjusted under 35 U.S.C. 154(b) by 581 days.

(21) Appl. No.: 13/865,613

(22) Filed: Apr. 18, 2013

(65) Prior Publication Data

US 2013/0277959 A1   Oct. 24, 2013

(30) Foreign Application Priority Data

Apr. 20, 2012   (EP) ..................................... 12164969

(51) Int. Cl.
*F16L 53/32* (2018.01)
*F16L 9/18* (2006.01)
*F16L 37/56* (2006.01)
*F28D 7/10* (2006.01)

(52) U.S. Cl.
CPC ................. *F16L 53/32* (2018.01); *F16L 9/18* (2013.01); *F16L 37/565* (2013.01); *F28D 7/103* (2013.01)

(58) Field of Classification Search
CPC ......... F16L 19/18; F16L 19/19; F16L 37/565; F16L 9/18; F16L 9/19; F16L 53/32; F28D 7/103
USPC ........... 285/123.15, 123.1, 123.3, 129.1, 904
See application file for complete search history.

(56) References Cited

U.S. PATENT DOCUMENTS

| 2,054,859 | A | * | 9/1936 | Kitching | ................. | E21B 17/18 |
| | | | | | | 285/123.1 X |
| 2,325,464 | A | * | 7/1943 | Bannister | .............. | E21B 17/203 |
| | | | | | | 285/123.1 X |
| 4,157,194 | A | * | 6/1979 | Takahashi | ........... | B29C 47/0023 |
| | | | | | | 138/109 |
| 5,092,401 | A | * | 3/1992 | Heynen | ................... | E21B 33/04 |
| | | | | | | 285/123.3 X |
| 5,239,964 | A | * | 8/1993 | Diener | ................. | F02M 69/462 |
| | | | | | | 285/123.1 X |
| 5,265,652 | A | * | 11/1993 | Brunella | .............. | B67D 7/0478 |
| | | | | | | 285/123.1 X |

(Continued)

FOREIGN PATENT DOCUMENTS

DE   38 15 608 A1   12/1988
DE   20 2007 015036 U1   3/2009

OTHER PUBLICATIONS

European Patent Office, European Search Report in European Patent Application No. 12 16 4969.3 (dated Nov. 9, 2012).

*Primary Examiner* — Gregory J Binda
*Assistant Examiner* — Zachary T Dragicevich
(74) *Attorney, Agent, or Firm* — Brinks Gilson & Lione

(57) ABSTRACT

A connector for a fluid medium to be conditioned, wherein an internal pipe is provided for the fluid medium to be conditioned and at least one external pipe for a fluid conditioning medium. The internal pipe is encompassed by the external pipe and runs substantially parallel to the external pipe. At least one conducting channel is arranged between the internal pipe and the external pipe for the fluid conditioning medium or for the fluid medium to be conditioned. In one form the connector is made by injection molding.

11 Claims, 3 Drawing Sheets

(56) References Cited

U.S. PATENT DOCUMENTS

| | | | | |
|---|---|---|---|---|
| 5,433,252 A | * | 7/1995 | Wolf | F16L 9/18 |
| | | | | 138/111 |
| 5,687,993 A | * | 11/1997 | Brim | F16L 39/02 |
| | | | | 285/123.1 X |
| 6,032,699 A | * | 3/2000 | Cochran | B67D 7/3209 |
| | | | | 138/104 |
| 7,302,936 B2 | * | 12/2007 | Stolarz | B60K 15/01 |
| | | | | 123/468 |
| 7,509,979 B2 | * | 3/2009 | Henriksson | F16L 55/045 |
| 2011/0241333 A1 | | 10/2011 | Borgmeier et al. | |

\* cited by examiner

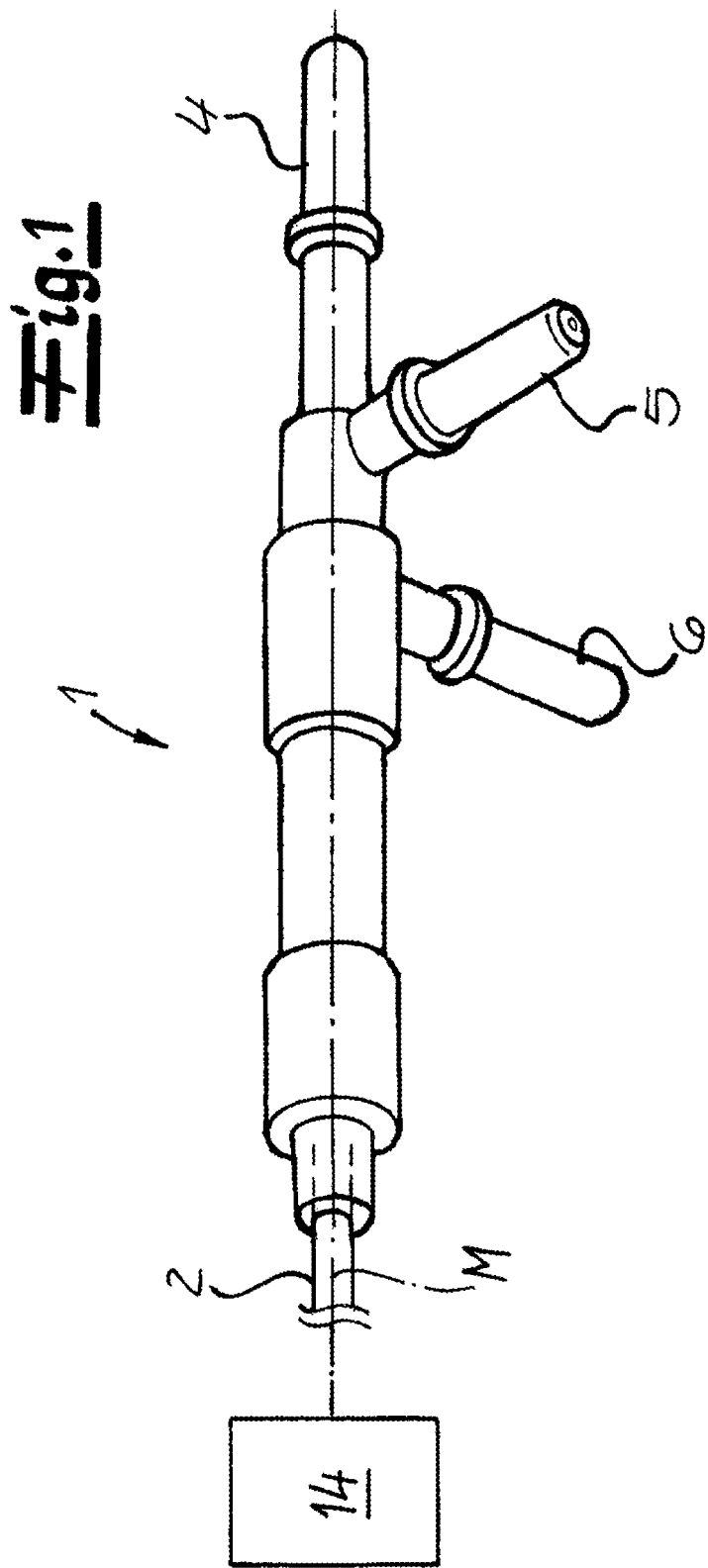

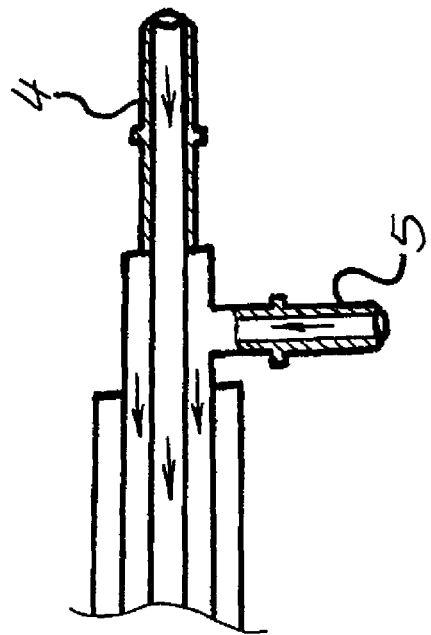
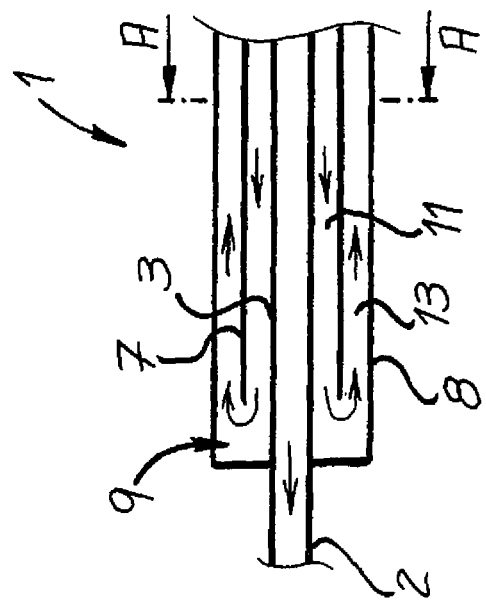

CONNECTOR

CROSS-REFERENCE TO RELATED APPLICATION

This patent application claims priority pursuant to Title 35 USC Section 119(e) to European Patent Application No. 12 164 969.3 filed Apr. 20, 2012, the entire contents of which are hereby incorporated by reference herein.

DESCRIPTION

The invention relates to a connector, in particular a quick connector for the connection of at least one pipeline conducting a fluid medium to be conditioned, in particular a urea solution to be conditioned. The connector can connect the pipeline to an additional pipeline or to other components, for example to a tank for a fluid medium or the like. According to an especially preferred embodiment, the inventive connector or quick connector is designed for a detachable connection to an additional component or pipeline.

Connectors or quick connectors of the initially named type are known from practice in various embodiments. Conducting a urea solution to be conditioned within the scope of an SCR system through such a connector or quick connector is also already known. As a rule, an SCR System with an SCR catalytic converter is present in motor vehicles, in particular in vehicles with a diesel engine, for waste gas treatment (SCR: selective catalytic reduction). For an effective reduction of the nitrogen oxide contained in the exhaust of a motor vehicle a urea solution is added to the exhaust in front of an SCR catalytic converter. Such a urea solution or aqueous urea solution has the disadvantage that urea freezes at temperatures below –11 C and in some cases crystallizes. As a result, an additional functionally reliable supply of the urea solution is hampered or completely blocked and an effective reduction of the nitrogen oxide in the exhaust is impaired or prevented. To avoid such disturbances, the supply lines or pipelines for the urea solution are heated. It is also already known to heat a connector or quick connector connected to such a pipeline. In the process the heating is carried out as electric heating and to this end one or more heating wires are arranged on the connector or quick connector. In principle it is also known to carry out a heating of fluid conducting systems with the assistance of heated fluid media. Most known measures have the drawback that they can only be realized with a great deal of effort or with great expense and/or a sufficiently effective conditioning or heating of the fluid medium to be conditioned or of the urea solution to be conditioned is not ensured.

By way of contrast, the invention addresses the technical problem of specifying a connector and in particular a quick connector of the initially named type which can be produced simply and without great expense and with which at the same time a very effective conditioning of a fluid medium or of a urea solution is possible.

For the solution of this problem the invention teaches a connector, in particular a quick connector for the connection of at least one pipeline conducting a fluid medium to be conditioned, in particular a urea solution to be conditioned, wherein at least one connector element and/or socket element arranged at at least one end or front end of the connector is provided, wherein the connector exhibits an internal pipe for the medium to be conditioned or for a fluid conditioning medium, wherein the internal pipe is encompassed over a portion of the length of the internal pipe by an external pipe or is completely encompassed and wherein the internal pipe runs parallel or substantially parallel to the external pipe and wherein between the internal pipe and external pipe at least one conducting channel is arranged for the conditioning medium or for the medium to be conditioned.

According to one embodiment of the invention the inventive connector or quick connector is connected to a pipeline or to an additional pipeline and then expediently serves the purpose of connecting two pipelines or at least two pipelines. It lies within the scope of the invention that the inventive connector or quick connector is connected to an additional connector. A connector element of an inventive connector can then be plugged into a socket element of the additional connector or vice versa. The inventive connector can also be used for the connection of one pipeline to another component, for example to a tank or an injection nozzle or the like. To the extent to which a connector is mentioned here and subsequently, preferably a quick connector is meant which can be used in particular for a detachable connection to an additional component.

The fluid medium to be conditioned is in particular preferably a fluid medium to be heated. It lies within the scope of the invention that the fluid medium to be conditioned is a urea solution or an aqueous urea solution. Expediently, an inventive connector for the conduction of the urea solution to be conditioned or heated is an integral part of an SCR system in a motor vehicle.

The fluid conditioning medium is used to temper or heat the fluid medium to be conditioned. It lies within the scope of the invention that the fluid conditioning medium is a heated fluid conditioning medium. One recommended embodiment of the invention is characterized by the fact that the fluid to be conditioned is absorbed or flows into the internal pipe and that the fluid conditioning medium is absorbed or flows into the at least one conducting channel between the internal pipe and the external pipe.

One very preferred embodiment of the invention is characterized in that the inside wall of the external pipe is connected to the outside wall of the internal pipe via a plurality of webs and that the webs preferably extend parallel to the central longitudinal axis M of the internal pipe. It lies within the scope of the invention that the webs are integrally molded on the inside wall of the external pipe and on the outside wall of the internal pipe. As recommended the webs run over the length of the aggregate from the internal pipe and the external pipe, to be precise preferably without interruption or without gaps over the length of the aggregate of the internal pipe and external pipe. The space between the internal pipe and the external pipe is preferably divided into a plurality of conducting channels by the webs. Expediently the webs are arranged distributed uniformly over the periphery of the internal pipe or over the periphery of the external pipe. It lies within the scope of the invention that the webs run parallel to one another along the pipeline. Preferably the cross-section of the conducting channels limited by the internal pipe, the external pipe and the webs is equally large or substantially equally large. It is advisable to have all conducting channels exhibit the same cross-sectional shape or substantially the same cross-sectional shape.

Expediently the inside wall of the external pipe is connected to the outside wall of the internal pipe via at least two webs and preferably via at least three webs. Preferably the webs are made of thermoplastic plastic or substantially of thermoplastic plastic. It lies within the scope of the invention that the aggregate of internal pipe, external pipe and webs is produced by means of injection molding or is produced as an injection molded cart.

One very recommended embodiment of the inventive connector is characterized in that an exterior pipe is provided, that the aggregate of internal pipe and external pipe is arranged in the exterior pipe or is encompassed by the exterior pipe, in particular encompassed over the entire periphery of the aggregate and that the exterior pipe extends parallel or substantially parallel to the central longitudinal axis M of the internal pipe. It lies within the scope of the invention that at least one outward conducting channel is arranged between the external pipe and the exterior pipe, said outward conducting channel preferably perfused by the fluid conditioning medium. It is advisable that the entire aggregate of exterior pipe, external pipe and internal pipe as well as if applicable the webs is produced by injection molding or is produced as an injection molded part. It lies further within the scope of the invention that this entire aggregate is made of a thermoplastic plastic or substantially of a thermoplastic plastic.

One preferred embodiment of the invention is characterized in that the fluid to be conditioned is absorbed or flows into the internal pipe, that the fluid conditioning medium is absorbed or flows into the at least one conducting channel between the internal pipe and the external pipe and that the fluid conditioning medium is likewise absorbed or flows into the at least one outward conducting channel between the external pipe and the exterior pipe. Another embodiment of the invention is characterized in that the fluid conditioning medium is absorbed or flows into the internal pipe, that the fluid medium to be conditioned is absorbed or flows into the at least one conducting channel between the internal pipe and the external pipe and that the fluid conditioning medium is absorbed or flows into the at least one outward conducting channel between the external pipe and the exterior pipe.

According to one much recommended embodiment of the invention the inside wall of the exterior pipe is connected to the outside wall of the external pipe via a plurality of outer webs. The outer webs extend preferably parallel to the central longitudinal axis M of the internal pipe. It lies within the scope of the invention that the outer webs extend in longitudinal direction of the connector. It lies further within the scope of the invention that the outer webs are integrally molded on the inside wall of the exterior pipe and on the outside wall of the external pipe. Expediently the outer webs run over the length of the exterior pipe or over the length of the external pipe without interruption, or without gaps. It lies within the scope of the invention that the outer webs divide the space between the external pipe and the exterior pipe into a plurality of outward conducting channels, wherein the outward conducting channels preferably are perfused by the fluid conditioning medium. It is advisable that the outer webs are arranged distributed uniformly over the periphery of the exterior pipe or over the periphery of the external pipe. Advantageously, the outward conducting channels separated by the outer webs have an equally large cross-section or a substantially equally large cross-section and preferably the same cross-sectional shape. Expediently the inside wall of the exterior pipe is connected to the outside wall of the external pipe by at least two outer webs, preferably at least three outer webs and preferably at least four outer webs. It lies within the scope of the invention that the outer webs are made of thermoplastic plastic or substantially of thermoplastic plastic. Preferably the entire aggregate of exterior pipe, external pipe, internal pipe and outer webs as well as if applicable webs is produced by injection molding or as an injection molded part.

According to one preferred improvement of the invention the webs and/or the outer webs exhibit a trapezoidal-shaped cross-section. In the process the trapezoids taper as recommended to the center of the connector. Here in particular the center of the connector means the central longitudinal axis M of the internal pipe. In advantageous embodiment of the invention provision is made that the webs are staggered to the outer webs with respect to the periphery of the external pipe. Expediently one web is arranged in the center or about in the center between two outer webs with respect to the periphery of the external pipe.

According to one recommended embodiment of the invention the thickness of the internal pipe and/or the thickness of the external pipe and/or the thickness of the exterior pipe ranges from 0.6 to 3 mm, preferably 0.8 to 2.5 mm, preferably 0.09 to 2.2 mm and especially preferably 1 to 2 mm. It lies within the scope of the invention that the internal pipe and/or the external pipe and/or the exterior pipe are designed in the shape of a cylinder or substantially in the shape of a cylinder. It lies further within the scope of the invention that the internal pipe is arranged concentrically within the external pipe and/or that the external pipe or the aggregate of internal pipe and external pipe is arranged concentrically within the exterior pipe. A coaxial arrangement of internal pipe and external pipe and/or of external pipe and exterior pipe has proven to be successful within the scope of the invention.

According to one recommended embodiment of the invention the ratio of the inside diameter d of the internal pipe to the radial width $r_i$ of a conducting channel between the internal pipe and the external pipe and/or the ratio of the inside diameter d of the internal pipe to the radial width $r_a$ of an outward conducting channel between the external pipe and the exterior pipe ranges from 3 to 15, preferably from 4 to 14 and preferably from 4 to 12. It has proved to be advantageous that the inside diameter d of the internal pipe ranges from 1 to 10 mm, preferably 1.5 to 8 mm and preferably 2 to 6 mm. As recommended the radial width $r_i$ of a conducting channel and/or the radial width $r_a$ of an outward conducting channel range from 0.5 to 3 mm, preferably 0.6 to 2 mm, preferably 0.8 to 1.5 mm and especially preferably 0.8 to 1.2 mm.

It lies within the scope of the invention that the inventive connector is an integral part of the motor vehicle and that the conditioning medium is preferably a heated coolant or heated engine coolant and/or fuel or recycled fuel. According to one embodiment the heated coolant channeled from the cooling water circulation of the motor vehicle is used as a conditioning medium. In accordance with another embodiment variant the fuel recycled from the motor of the motor vehicle to the fuel tank is used as a conditioning medium.

One preferred embodiment of the invention is characterized in that the conditioning medium flows first through the at least one conducting channel between the internal pipe and the external pipe in a first direction along the connector, that a redirection region is provided for redirection of the conditioning medium to the at least one outward conducting channel between the external pipe and the exterior pipe and that the conditioning medium flows through the at least one outward conducting channel along the connector in a second direction opposite to the first direction. Expediently the conditioning medium is thus guided between the internal pipe and the external pipe on the one hand and between the external pipe and the exterior pipe on the other hand as it were in counterflow. In the process the conditioning medium flows preferably through a plurality of conducting channels separated by the webs as well as through a plurality of outward conducting channels separated by the outer webs.

It lies within the scope of the invention that the inventive connector exhibits at least one connection nozzle for supplying the fluid conditioning medium and/or at least one connection nozzle for removal of the fluid conditioning medium. Preferably the connector is equipped with both a connection nozzle for supplying the fluid conditioning medium and a connection nozzle for removal of the fluid conditioning medium. Expediently such a connection nozzle is designed as a connector element or socket element for the connection of a suitable socket element or connector element. It is advisable to have the connection nozzle or the connection nozzles arranged perpendicular or substantially perpendicular to the longitudinal axis of the connector. If the connector according to one embodiment—as will be explained further below—is designed as an angled connector, the term longitudinal axis of the connector refers to the connector segment connected to the connection nozzle or connection nozzles. It lies within the scope of the invention that the at least one connection nozzle for supplying the fluid conditioning medium is connected to the conducting channels between the internal pipe and the external pipe and/or that the at least one connection nozzle for removal of the fluid conditioning medium is connected to the outward conducting channels between the external pipe and the exterior pipe.

Expediently the inventive connector and in particular the aggregate of exterior pipe, external pipe, internal pipe, webs and outer webs is made of thermoplastic plastic or substantially of thermoplastic plastic. According to one embodiment the connector or the aforementioned aggregate consists of a polyamide or substantially of a polyamide. The polyamide can in particular be polyamide 12. According to another embodiment of the invention high temperature resistant plastics are used for the inventive connector.

It lies within the scope of the invention that the inventive connector or in particular the aggregate of exterior pipe, external pipe, internal pipe, webs and outer webs is produced by injection molding.

It lies further within the scope of the invention that the aggregate of internal pipe, external pipe and exterior pipe is encompassed by at least one additional exterior pipe and that the internal pipe, external pipe, exterior pipe and the at least one additional exterior pipe are arranged concentrically to one another or coaxially. Expediently the additional exterior pipe is also connected to the exterior pipe via additional exterior webs. It is advisable to have the fluid conditioning medium flow also through the intermediate space or through the channels between the exterior pipe and the additional exterior pipe, to be precise preferably in a direction opposite to the direction of flow with which the conditioning medium flows through the outward conducting channels between the external pipe and the exterior pipe.

The invention is based on the understanding that with the inventive connector a surprisingly effective conditioning of a fluid medium, in particular of a urea solution is possible. A urea solution conducted through the inventive connector can be effectively protected from freezing or crystallizing easily and without problems. In addition the inventive connector can be produced with relatively simple and inexpensive means. Advantageously an expensive electric heating with heating wires or the like can be dispensed with. The energy resources that are present anyway or are present in the motor vehicle anyway can be drawn on without requiring an additional supply of energy.

An inventive connector can be implemented or produced relatively cost-effectively.

In the following the invention will be explained in greater detail with the assistance of a drawing presenting only one exemplary embodiment. The figures show the following:

FIG. 1 shows a perspective representation of an inventive connector,

FIG. 2 shows quite schematically the flow directions of the fluid media in the inventive connector and FIG. 3 shows a section A-A through the subject matter according to FIG. 2.

Figure 3:
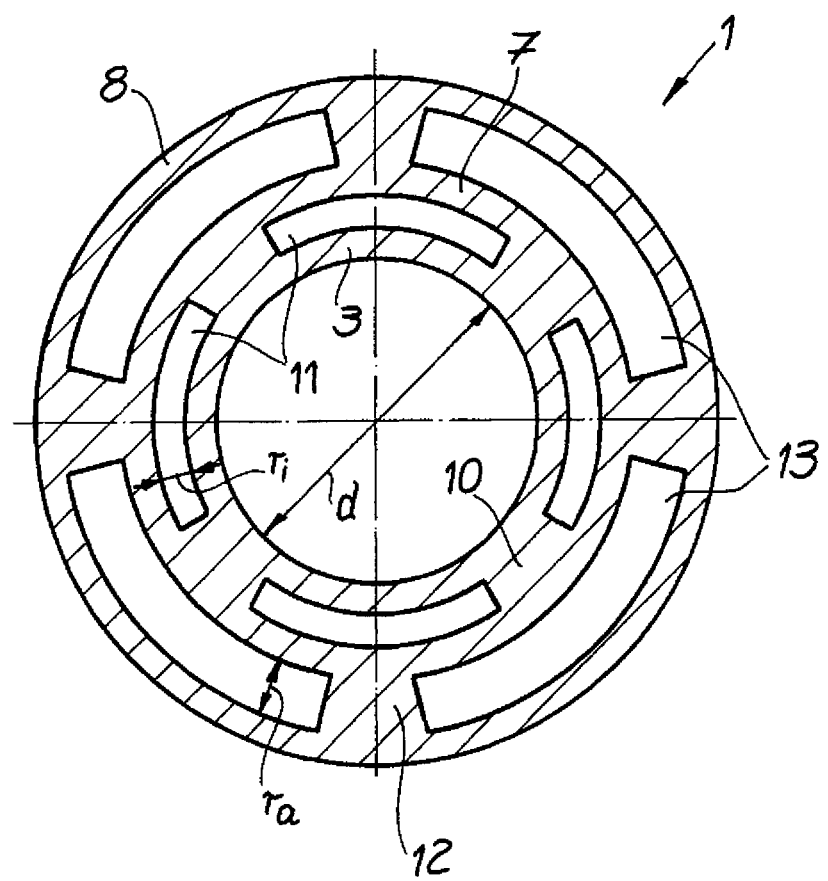

The figures show an inventive connector 1 designed as a quick connector for the connection of a pipeline 2 conducting a urea solution to be conditioned to a component not shown in further detail, for example to an additional connector or to an additional pipeline. In FIGS. 1 and 2 it can be recognized that the pipeline 2 is connected to the left front side of the connector 1. On the other front end or on the right front end in FIGS. 1 and 2 the connector 1 exhibits a connector element 4 for connection to a socket element of an additional component not shown in the figure. Further the connector 1 in the exemplary embodiment according to FIGS. 1 and 2 is equipped with a connection nozzle 5 for supplying a fluid conditioning medium and with a connection nozzle 6 for the removal of the fluid conditioning medium. Expediently and in the exemplary embodiment according to the figures the connection nozzles 5, 6 are designed as connector element analogous to the connector element 4 on the one front end of the connector 1.

The connector 1 exhibits an internal pipe 3 for the conduction of the aqueous urea solution. This urea solution is supplied to an SCR catalytic converter 14 of a motor vehicle (schematically shown in FIG. 1). The internal pipe 3 is encompassed by an external pipe 7 so that the internal pipe 3 and the external pipe 7 are arranged concentrically or coaxially to one another (see in particular FIG. 3). The external pipe 7 or the aggregate of internal 9 pipe 3 and external pipe 7 is encompassed by an exterior pipe 8, so that the internal pipe 3, the external pipe 7 and the exterior pipe 8 are arranged concentrically or axially to one another.

FIG. 2 schematically indicates with arrows the flow or the direction of flow of the urea solution on the one hand and of the fluid conditioning medium for the heating of the urea solution on the other hand. The connector 1 shown in the figures is preferably and in the exemplary embodiment an integral part of a motor vehicle and the fluid conditioning medium according to one embodiment is the heated coolant channeled from the cooling water circulation.

In the exemplary embodiment according to FIG. 2 the urea solution flows from right to left through the internal pipe 3. The fluid conditioning medium supplied via the connection nozzle 5 flows in the same direction as the urea solution through the intermediate space between the internal pipe 3 and the external pipe 7 to be precise, to a redirection region 9. Here the intermediate space between the internal pipe 3 and the external pipe 7 is in fluid connection with the intermediate space between the external pipe 7 and the exterior pipe 8. The conditioning medium is redirected in the redirection region 9 to the intermediate space between the external pipe 7 and the exterior pipe 8 and in the exemplary embodiment according to FIG. 2 flows in the opposite direction from left to right. By virtue of this design a very effective conditioning of the urea solution is achieved in the internal pipe 3. The conditioning medium then flows in the intermediate space between the external pipe 7 and the exterior pipe 8 to the connection nozzle 6 and is removed there again. In accordance with the embodiment present in the figures the connection nozzle 6 is arranged at a right angle to the connection nozzle 5. Thus the connection nozzle 6 is concealed by the connector 1 in FIG. 2 and hence cannot be recognized.

FIG. 3 shows a section through the connector 1 according to FIG. 2. It can be recognized that the inside wall of the external pipe 7 in the exemplary embodiment is connected via four webs 10 to the outside wall of the internal pipe 3. The webs 10 extend preferably without interruption in longitudinal direction of the aggregate of internal pipe 3 and external pipe 7 or parallel to the central longitudinal axis M of the connector 1. In this way the intermediate space between the internal pipe 3 and the external pipe 7 in the exemplary embodiment is divided into four conducting channels 11 for the fluid conditioning medium. In FIG. 3 it can be additionally recognized that the inside wall of the exterior pipe 8 in the exemplary embodiment is connected to the outside wall of the external pipe 7 via four outer webs 12. Expediently the outer webs 12 extend without interruption over the length of the aggregate of external pipe 7 and exterior pipe 8 in longitudinal direction of the connector 1 or parallel to the central longitudinal axis M of the connector 1. Hence the intermediate space between the external pipe 7 and the exterior pipe 8 is divided into four outward conducting channels 13. Preferably and in the exemplary embodiment the webs 10 and the outer webs 12 are arranged parallel to one another. In the exemplary embodiment the webs 10 and the outer webs 12 exhibit a trapezoidal-shaped cross-section. In the process the trapezoids taper preferably to the middle of the connector 1 or to the central longitudinal axis M. According to one embodiment and in the exemplary embodiment according to FIG. 3 the webs 10 are staggered to the outer webs 12 with respect to the periphery of the external pipe 7. In the process, in the exemplary embodiment a web 10 is arranged in the central region of the adjacent outward conducting channel 13 and an outer web 12 is arranged in the central region of the adjacent conducting channel 11.

In particular from a comparison of FIGS. 2 and 3, one gathers that according to the preferred embodiment and in the exemplary embodiment the internal pipe 3, the external pipe 7 and the exterior pipe 8 are designed cylindrical with an annular cross-section. The internal pipe 3 in the exemplary embodiment is arranged concentrically within the external pipe 7 and the aggregate of internal pipe 3 and external pipe 7 in the exemplary embodiment is arranged concentrically within the exterior pipe 8. The inside diameter d of the internal pipe 3 ranges preferably from 2 to 6 mm. The radial width $r_i$ of a conducting channel 11 ranges expediently from 0.8 to 1.5 mm. Preferably the radial width $r_a$ of an outward conducting channel 13 also ranges from 0.8 to 1.5 mm. As recommended, the width of the internal pipe 3 and the thickness of the external pipe 7 as well as the thickness of the exterior pipe 8 ranges from 0.9 to 2.2 mm.

According to an alternative embodiment of the invention the fluid medium to be conditioned or the urea solution can also flow through the conducting channels 11 between the internal pipe 3 and the external pipe 7. In this case the fluid conditioning medium expediently flows through the internal pipe 3 on the one hand and through the outward conducting channels 13 between the external pipe 7 and the exterior pipe 8 on the other hand.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The claims are to be construed to include alternative embodiments to the extent permitted by the prior art.

We claim:

1. A connector for connection of an at least one pipeline conducting a fluid medium to be conditioned, the connector comprising:
    at least one connector element or socket element arranged at at least one end of said connector,
    wherein said connector includes an internal pipe for the fluid medium to be conditioned or for a fluid conditioning medium, wherein said internal pipe is encompassed at least over a portion of a length thereof by an external pipe wherein the internal pipe runs substantially parallel to the external pipe and wherein between the internal pipe and external pipe at least one conducting channel is arranged for the fluid conditioning medium or for the fluid medium to be conditioned,
    wherein at least one exterior pipe is provided, wherein an aggregate of the internal pipe and the external pipe is encompassed by the exterior pipe, wherein the exterior pipe extends substantially parallel to a central longitudinal axis of the internal pipe and wherein at least one outward conducting channel is arranged between the external pipe and the exterior pipe, wherein the connector includes at least one connection nozzle in direct fluid communication with the at least one conducting channel for supplying the fluid conditioning medium and at least one connection nozzle for removal of the fluid conditioning medium, and the connection nozzles for supplying and removal of the fluid conditioning medium are disposed at or proximate to the end of the connector with the connector element or socket element, and that the connector comprises only one outlet at an opposite end of the connector that is opposite to the end with the connector element or socket element,
    wherein the exterior pipe, the external pipe and the internal pipe are made of thermoplastic plastic, wherein a redirection region is provided at the opposite end of the connector that is opposite to the end with the connector element or socket element for connection of the at least one conducting channel between the internal pipe and the external pipe with the at least one outward conducting channel between the external pipe and the exterior,
    wherein the internal pipe axially reaches through the redirection region.

2. The connector according to claim 1, wherein the inside wall of the external pipe is connected to the outside wall of the internal pipe via a plurality of inner webs and wherein the inner webs extend parallel to the central longitudinal axis of the internal pipe.

3. The connector according to claim 2, wherein the inside wall of the exterior pipe is connected to the outside wall of the external pipe via a plurality of outer webs and wherein the outer webs extend parallel to the central longitudinal axis of the internal pipe.

4. The connector according to claim 3, wherein the inner webs, the outer webs, or a combination of the inner and outer webs each exhibit a trapezoidal-shaped cross-section.

5. The connector according to claim 3, wherein at least a portion of the connector produced by injection molding.

6. The connector according to claim 1, wherein the thickness of the internal pipe and/or the thickness of the external pipe and/or the thickness of the exterior pipe ranges from 0.6 to 3 mm.

7. The connector according to claim 1, wherein the internal pipe and/or the external pipe and/or the exterior pipe are cylindrical.

8. The connector according to claim 1, wherein the internal pipe is arranged concentrically within the external pipe and wherein the external pipe or the aggregate of internal pipe and external pipe is arranged concentrically within the exterior pipe.

9. The connector according to claim 1, wherein the ratio of the inside diameter (d) of the internal pipe to the radial width ($r_i$) of a conducting channel between the internal pipe and the external pipe and/or to the radial width ($r_a$) of an outward conducting channel between the external pipe and the exterior pipe ranges from 3 to 15.

10. The connector according to claim 1, wherein the inside diameter (d) of the internal pipe ranges from 1 to 10 mm.

11. The connector according to claim 1, wherein the radial width ($r_i$) of a conducting channel and/or the radial width ($r_a$) of an outward conducting channel ranges from 0.5 to 3 mm.

* * * * *